May 20, 1969     C. W. BURNS     3,444,728
DEVICE FOR TESTING THE STRETCH OF FABRIC SAMPLES
Filed Feb. 14, 1967     Sheet 1 of 2
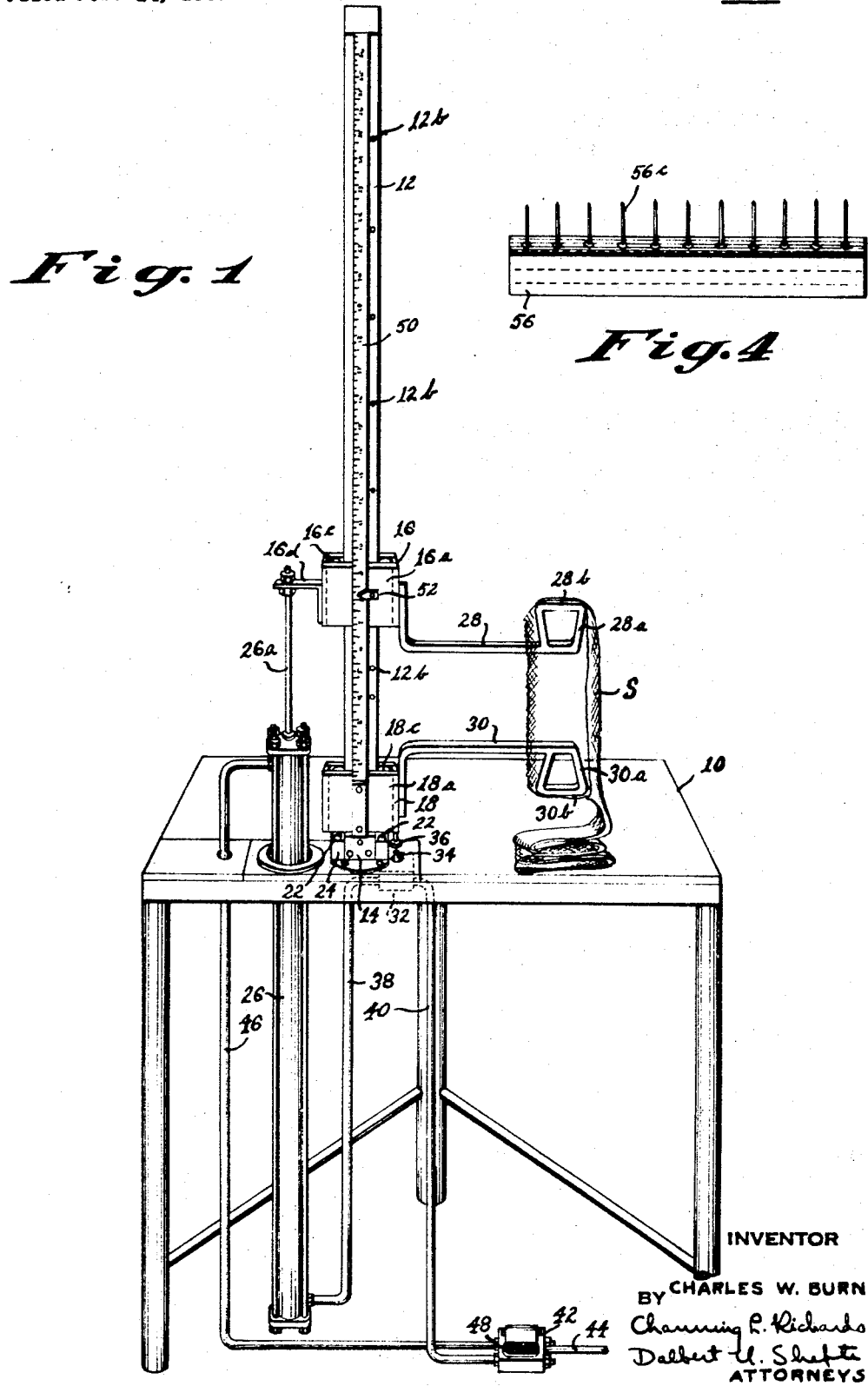
INVENTOR
CHARLES W. BURNS
BY
ATTORNEYS

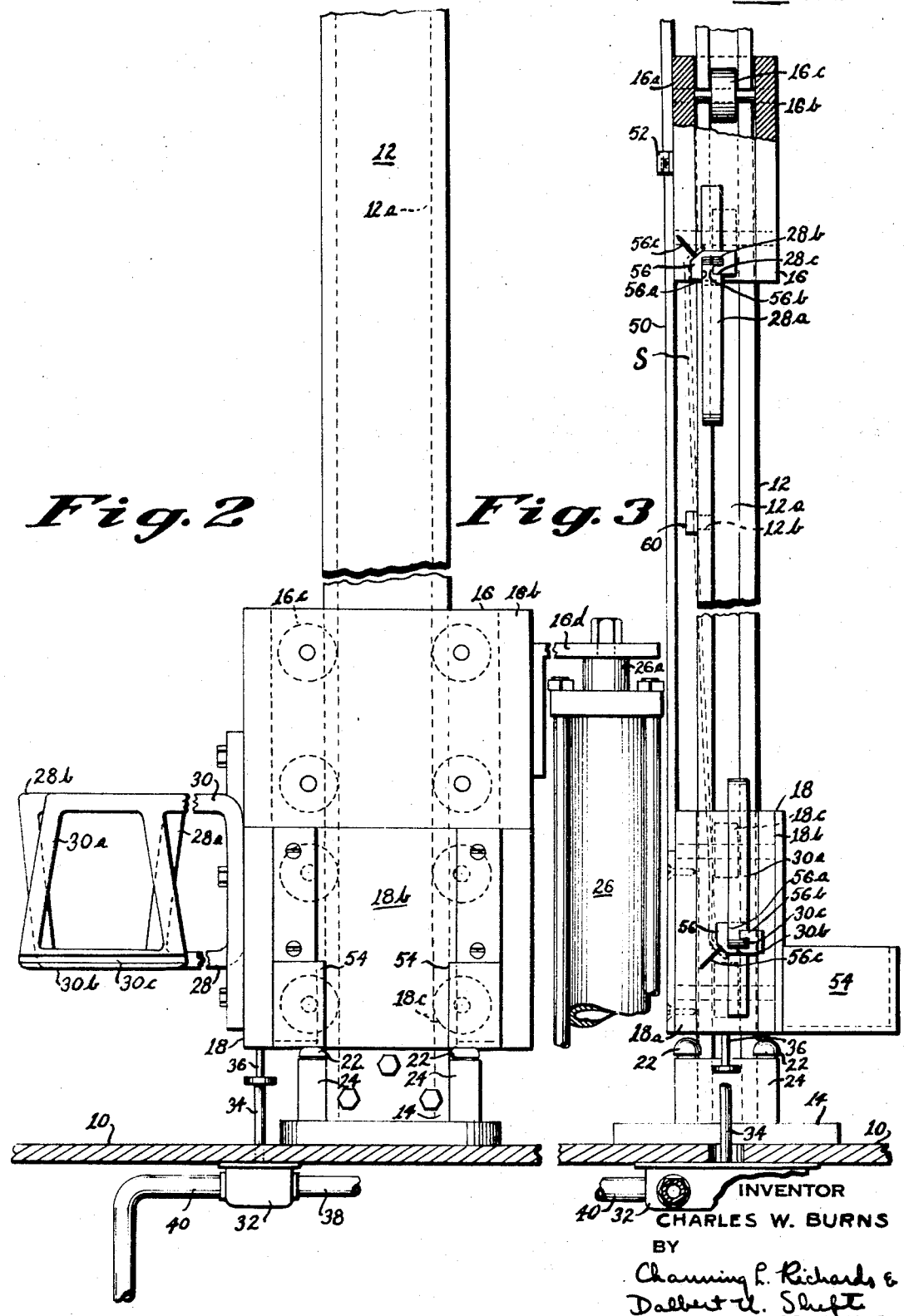

United States Patent Office 3,444,728
Patented May 20, 1969

3,444,728
DEVICE FOR TESTING THE STRETCH OF
FABRIC SAMPLES
Charles W. Burns, c/o Hickory Foundry & Machine Co.,
P.O. Box 724, Hickory, N.C. 28601
Filed Feb. 14, 1967, Ser. No. 616,120
Int. Cl. G01n 3/28
U.S. Cl. 73—97                                    14 Claims

ABSTRACT OF THE DISCLOSURE

A device for testing the stretch of fabric samples with a pair of independently movable members, one of which is positively moved to stretch a sample between the members and through the connection of the stretched sample to move the other member, which other member imposes a known stretching load on the sample. Movement of the load imposing member initiates a response that automatically stops the members in their sample stretching positions to allow measurement of the stretched extent of the sample.

Background of the invention

The present invention pertains to the field of stretch testing of fabrics to determine the extent of stretch when subjected to a known load. Such devices are commonly used in the textile industry, and particularly in hosiery manufacture, for quality control, sizing and other related purposes.

Prior art devices of this sort have a pair of members on which a fabric sample is mounted for stretching by movement of the members apart to impose a standard or predetermined stretching load on the sample. Typical devices are disclosed in Gosch U.S. Patent No. 1,817,617 and Reitan U.S. Patent No. 2,187,914. In the Gosch device one of the members is fixed and the other is moved by a weighted mechanism attached thereto with the stretching load being imposed through the movable member. As a result, the inherent characteristics of the mechanism that operates to move the movable member have an effect on the load imposed such that loading is subject to being inaccurate and inconsistent.

In the Reitan device both stretching members are movable, with one being restrained by a spring scale that provides a reading of the load imposed when the other member is moved by manual operation of an operating mechanism. With this device, a preselected load is not automatically imposed, rather the operator must take special care to stop the operation at a desired scale reading to obtain reliable results as any over or under movement will result in the application of a load other than that desired. Thus the reliability of the device is dependent upon the skill and reliability of the operator.

In contrast to the prior art devices, the stretch testing device of the present invention operates automatically to impose a predetermined stretch load consistently and reliably with a simple mechanism that operates easily and rapidly without control and without being subject to the inexperience or unreliability of the operator.

Summary of the invention

Briefly described, the device for testing the stretch of fabric samples of the present invention includes a pair of independently movable members adapted for mounting a fabric sample thereon for stretching therebetween, with one of the members having a predetermined resistance to movement for imposing a proportional stretching load on the sample. Means is provided for moving the other member to stretch the sample and through the stretched sample connection to move the load imposing member, thereby imposing the stretching load on the sample. Movement of the load imposing member is responded to by means for controlling the moving means to stop further movement of the other member. Thus, the device functions automatically to impose a desired stretching load and to stop when that load has been imposed so that the stretched extent of the fabric sample can be determined. This automatic operation provides consistently reliable results quickly, and significantly reduces the time and effort of the operator, as well as eliminates substantially the effect of the reliability of the operator.

A testing operation is accomplished easily and rapidly with this device simply by placing a fabric sample on the members and actuating the moving means, which stops as soon as the stretching load is imposed to permit measurement of the stretched extent of the sample.

In the preferred embodiment the members are slidably mounted on a vertical guide bar that extends upwardly from a supporting structure on which the load imposing member is supported. A pneumatic piston-cylinder mechanism is connected to the other member, which is above the load imposing member, for raising of the other member to stretch a fabric sample between the members and through the connected sample raise the load imposing member from the supporting structure with the weight of the load imposing member being imposed as a stretching load on the sample. A valve unit is disposed in the pneumatic feed to the piston-cylinder mechanism and has a control element engaged by the load imposing member when it is supported on the supporting structure to maintain the valve unit in open position for pneumatic feed to the piston-cylinder mechanism. This control element is disengaged by the load imposing member upon upward movement thereof to close the valve unit and thereby effect closing of the pneumatic feed to stop the movement of the members and hold them for measurement of the extent of stretch of the sample by reading the indicia on a scale that is fixed to one of the members and extends to the other member and is calibrated to indicate directly the extent of stretch. Automatic operation of the device is initiated by manually operating an actuating means that controls pneumatic feed to and discharge from the piston-cylinder mechanism. When the actuating means is released following a stretch reading it acts to stop the pneumatic feed and to discharge the piston-cylinder mechanism to effect lowering of the members to their initial positions for removal of the sample.

Brief description of the drawings

FIG. 1 is a perspective view of the preferred embodiment of the device for testing the stretch of fabric samples of the present invention.

FIG. 2 is an enlarged rear elevational view, partially in section, of the center portion of the device of FIG. 1.

FIG. 3 is an enlarged side elevational view, partially in section, of the center portion of the device of FIG. 1 showing adapter elements mounted on the sample mounting arms.

FIG. 4 is an enlarged front elevational view of one of the adapted elements shown in FIG. 3.

Description of the preferred embodiment

As illustrated in the accompanying drawings, the preferred embodiment of the device for testing the stretch of fabric samples of the present invention includes a main supporting structure or table 10 on which is secured a guide bar 12 by a pair of opposed angle brackets 14 that are bolted to the table and to opposite sides of the guide bar 12 with the guide bar extending vertically above the table for guiding vertical movement of a pair of slide members 16 and 18 that are vertically aligned and independently movable on the guide bar 12. These members 16 and 18 have opposed front plates 16a and 18a and back plates 16b and 18b that sandwich the guide bar 12 therebetween and support opposed pairs of rollers 16c and 18c that ride in opposed vertical slots 12a in the guide bar 12.

The lower member 18 is supported on rubber bumpers 22 attached to the top of bumper plates 24 that are secured to the ends of the angle brackets 14. The upper member 16 rests in its inoperative position on top of the lower member 18 and is independently movable upwardly away therefrom by the action of a vertically disposed piston-cylinder mechanism 26 that is mounted in the table 10 and has the extending end of the piston 26a secured to a flange 16d extending laterally from the upper member 16.

Extending laterally from the members 16 and 18 in the opposite direction from the piston-cylinder mechanism 26 are sample mounting arms 28 and 30, respectively. The upper arm 28 is offset downwardly and has an upwardly extending outer portion 28a and the lower arm is complementarily formed with an upward offset and a downwardly extending outer portion 30a, with the outer portions 28a and 30a overlapping when the upper member 16 and lower member 18 are in their inoperative lower positions. The outer portions 28a of the upper arm 28 has a flat top surface 28b for mounting of a fabric sample S thereon and the outer portion 28a converges slightly downwardly away from this top surface 28b to avoid interference with the stretching of the fabric sample. Similarly the outer portion 30a of the lower arm 30 has a flat lower surface 30b for mounting of the fabric sample S thereon and converges upwardly away from the surface to avoid interference with the fabric sample mounted thereon. This mounting arrangement for the fabric sample S utilizes the fabric sample as a connection between the otherwise independently movable upper and lower members 16 and 18, respectively, so that when the upper member 16 is raised by the action of the piston-cylinder mechanism 26 the fabric sample S will be stretched between the arms 20 and 30 with the stretching load imposed by the weight of the lower member 18. When the fabric sample S has stretched to its maximum limit under the imposed load, further upward movement of the upper member 16 will act through the fabric sample connection to raise the lower member 18 from support on the table 10 and the entire weight of the lower member 18 will be imposed as a stretching load on the fabric sample S.

As soon as the lower member 18 has moved from the table 10 and imposed its full weight on the sample S, the operation is automatically stopped by the operation of a valve unit 32 mounted to the underside of the table 10 and having a control element 34 extending through the table 10 into engagement with a stud 36 that extends downwardly from the lower member 18 and depresses the control element 34 downwardly into valve unit opening position when the lower member 18 is at rest on the table 10. Upward movement of the lower member 18 results in the stud 36 releasing the control element 34 to move upwardly into valve unit closing position (compare FIGS. 2 and 3). The valve unit 32 is connected to the bottom of the piston-cylinder mechanism 26 by a line 38 and is connected by another line 40 to a foot pedal operated main control valve mechanism 42, which is connected to the pneumatic supply line 44 and also to a line 46 connecting the main control valve mechanism 42 with the top of the piston-cylinder mechanism 26.

The foot pedal 48 of the main control valve mechanism 42 is normally in a raised inoperative position at which the supply line 44 is closed and the line 40 from the valve unit 32 is open to the atmosphere as is the line 46 from the top of the piston-cylinder mechanism 26 with the result that the piston-cylinder mechanism will be retracted and the members 16 and 18 will be in their lowered inoperative positions preparatory to mounting a fabric sample on the arms thereof.

When the foot pedal 48 is depressed by an operator, the main control valve mechanism 42 is manipulated by the foot pedal 48 to connect the pneumatic supply line 44 with the line 40 to the valve unit 32. When the lower member is at rest on the table 10 such that the stud 36 depresses the valve unit control element 34 into valve open position, the pneumatic feed from the supply line 44 through the main control valve mechanism 42 will be connected to the bottom of the piston-cylinder mechanism 26 through the line 38 to effect extension of the piston-cylinder mechanism 26, during which extension the air in the top of the mechanism escapes through the line 46 and out of the main control valve mechanism 42.

When the piston-cylinder mechanism 26 has extended sufficiently to raise the upper member 16 to fully stretch the fabrgic sample S and therethrough raise the lower member 18, the lower member stud 36 will release the valve unit control element 34, which moves to a valve unit closing position that stops feed of the supply air to the piston-cylinder mechanism 26, thereby stopping further extension of the mechanism and holding the upper member 16 in its raised position. In this raised position the fabric sample S is retained at its stretched limit and the extent of stretch can be readily measured by referring to indicating means in the form of an elongated scale member 50 that is secured to the lower member front plate 18a and extends vertically along the upper member front plate 16a. The scale member 50 bears indicia calibrated in relation to a pointer 52 carried by the upper member 16 and overlaying the indicia to indicate directly the extent of stretch of the fabric sample S. As the scale member 50 is fixed to the lower member 18 it moves therewith so that the reading obtained is not affected by the lower member movement as it would be if the scale member 50 were fixed to the stationary table 10.

As the piston-cylinder mechanism 26 is held in the upper member raised position, the operator has time to make an accurate reading as compared with a device that would return the elements to their initial position immediately upon reaching the stretch limit.

Lowering of the upper member 16 through retraction of the piston-cylinder mechanism 26 is effected by releasing the foot pedal 48, which rises to its elevated initial position, thereby manipulating the main control valve mechanism 42 to close the connection of the supply line 44 to the line 40 to the valve unit 32, with the result that a regulator component in the valve unit 32 functions to permit bleeding of the air from the bottom of the piston-cylinder mechanism 26 so that the mechanism will retract and in doing so will lower the upper member 16 and indirectly the lower member 18. When the lower member 18 reaches its lowered position, the stud 36 thereof will have depressed the control element 34 to open again the valve unit 32. The regulator component of the valve unit 32, however, continues to bleed the bottom of the piston-cylinder mechanism 26 for continued retraction thereof until the upper member 16 abuts the lower member 18.

In a typical operation, the device of the present invention is used to measure the extent of widthwise stretch of a stocking sample S. This is done by slipping the tubular stocking sample over the outer portions 28a and 30a of the upper and lower arms 28 and 30, respectively, to position the portion of the sample to be tested on the arm outer portion surfaces 28b and 30b. The foot pedal 48 is then depressed and the device functions automatically without manual control to raise the upper member 16, which stretches the sample S, and through the sample connection raises the lower member 18 when the sample reaches the limit of its stretch in relation to the weight of the lower member 18. As soon as the lower member 18 moves upwardly, the stud 36 thereof releases the control element 34 of the valve unit 32 to automatically close the valve unit and stop the extension of the piston-cylinder mechanism 26. This results in automatic stopping of the upper member 16 and holding of the upper member 16 to permit the reading of the extent of fabric stretch as indicated on the scale member 50. The operator then releases the foot pedal 48 which closes the supply line 44 to effect automatic return of the piston-cylinder mechanism 26 and upper and lower members 16 and 18 to their original positions for removal of the stocking sample S.

With the device of the present invention, the stretching load is simply the weight of the lower member 18. This weight can be varied for different testing conditions by mounting additional weights on the lower member 18, for which purpose a pair of rearwardly extending weight holding brackets 54 are secured to the lower member back plate 18b.

The present device is also adaptable to testing the stretch of flat, rather than tubular, fabric samples and to measuring tubular samples lengthwise, such as measuring the lengthwise stretch of stocking samples. For this purpose, adapter elements 56 are provided for mounting over the upper arm outer portion top surface 28b and the lower arm outer portion lower surface 30b. These adapter elements (FIGS. 3 and 4) are slotted as at 56a to slidably fit over the arm surfaces 28b and 30b with a transverse tongue 56b extending into the slots 56a for mating with slots 28c and 30c formed in the upper arm outer portion 28a and lower arm outer portion 30a adjacent the surfaces 28b and 30b thereof. The adapter elements have a plurality of pin elements 56c extending therefrom at an inclination away from the arms 28 and 30 for engagement thereon of the ends of a fabric sample, which is stretched between the pin elements 56c of the opposed adapter elements 56 to obtain test results in the same manner as when testing the tubular stretch as described hereinbefore. However, when testing relatively long lengths of fabric, such as lengthwise testing of stockings, it is desirable to separate initially the upper member 16 from the lower member 18 a substantial distance before mounting the sample thereon. Such initial separation is possible with the device of the present invention, for which purpose the guide bar 12 is formed with a vertically spaced series of holes 12b in which a stop plug element 60 may be inserted below a selected raised position of the upper member 16. The stop plug element 60 projects from the guide bar 12 sufficiently to stop downward movement of the upper member 16 therepast for positioning of the upper member 16 in an initial raised position from which it is elevated during operation of the device.

It should be understood that the foregoing detailed description is provided for the purpose of illustration only and that the present invention is not intended to be limited to the specific details described and modifications and variations may be made within the scope of the present invention. For example, the operating system could be hydraulic or electropneumatic or other suitable means rather than the pneumatic system described; other configurations for the support arms 28 and 30 could be substituted; clamps or other means could be used in place of the adapter elements 56 for lengthwise testing; and other modifications and variations may be utilized within the scope of the present invention, which is not intended to be limited by the foregoing description or otherwise, except as defined in the appended claims.

I claim:

1. A device for testing the stretch of fabric samples, said device comprising a pair of independently movable members adapted for mounting a fabric sample theeron for stretching therebetween, one of said members having a predetermined resistance to movement for imposing a proportional stretching load on the sample, means for moving the other of said members to stretch the sample and through the stretch sample connection to move said load imposing member, thereby imposing said stretching load on the sample, and means responsive to initial movement of said load imposing member for controlling said moving means to stop further movement of said other member.

2. The device for testing the stretch of fabric samples according to claim 1 and characterized further in that said responsive means controls said moving means to hold said other member in stopped position to retain the sample in stretched condition for measuring the stretched extent thereof.

3. The device for testing the stretch of fabric samples according to claim 1 and characterized further by measuring means fixed to one and extending to the other of said members for indicating the extent of spacing therebetween said bearing indcia calibrated to indicate directly the stretched extent of the sample.

4. The device for testing the stretch of fabric samples according to claim 1 and characterized further in that said load imposing member is weighted to obtain said resistance to movement.

5. The device for testing the stretch of fabric samples according to claim 1 and characterized further in that said responsive means comprises a control element operably connected to said moving means and engaged by said load imposing member prior to movement thereof to permit operation of said moving means, said control element being disengaged upon initial movement of said load imposing member to control the moving means to stop further movement of said other member.

6. The device for testing the stretch of fabric samples according to claim 5 and characterized further in that said moving means is a pneumatic piston-cylinder mechanism operably connected to said other member, and said control element controls the pneumatic feed to said mechanism and is operable to open the feed when the control element is engaged by said load imposing member prior to movement thereof and to close the feed when disengaged upon initial movement of said load imposing member.

7. The device for testing the stretch of fabric samples according to claim 1 and characterized further by a supporting structure on which said load imposing member is supported, said other member being disposed above said load imposing member for vertical movement upwardly therefrom, said load imposing member remaining supported on said supporting structure until the other member has moved sufficiently to stretch the sample and through the stretched sample connection raise the load imposing member from the supporting structure, and said responsive means being responsive to raising of the load imposing member from the supporting structure to control the moving means to stop further movement of said other member.

8. A device for testing the stretch of fabric samples, said device comprising a supporting structure, a guide bar secured to and extending vertically above said supporting structure, a pair of vertically aligned members slidably mounted on said guide bar for independent movement and adapted for mounting a fabric sample thereon for stretching therebetween, the lower of said members being normally supported on said supporting structure, means for raising said upper member to stretch the sample and through the connection of the sample raise said lower member from said supporting structure with the weight of the lower member imposing a stretching load on said sample, and means responsive to initial raising of said lower member from said supporting structure for controlling said moving means to stop further raising of said upper member.

9. The device for testing the stretch of fabric samples according to claim 8 and characterized further by measuraing means fixed to one and extending to the other of said members for indicating the extent of spacing therebetween and bearing indicia calibrated to indicate directly the stretched extent of the sample.

10. The device for testing the stretch of fabric samples according to claim 8 and characterized further in that said responsive means controls said moving means to hold said upper member in stopped position to retain the sample in stretched condition under the load of the raised lower member for measuring the stretched extent thereof.

11. The device for testing the stretch of fabric samples according to claim 10 and characterized further by manually operable means for actuating said moving means under the control of said responsive means and for deactivating said moving means for return of said upper member.

12. The device for testing the stretch of fabric samples according to claim 8 and characterized further in that said moving means is a pneumatic piston-cylinder mechanism operably connected to said upper member, and said responsive means controls pneumatic feed to said mechanism.

13. The device for testing the stretch of fabric samples according to claim 12 and characterized further in that said responsive means is a valve unit disposed in the pneumatic feed to said piston-cylinder mechanism and having a control element being engaged by said lower member when it is supported on said supporting structure to maintain said valve unit in open position for pneumatic feed to said piston-cylinder mechanism, and said control element being disengaged by said lower member upon upward initial movement thereof to close said valve unit and thereby effect closing of the pneumatic feed to said piston-cylinder mechanism to stop further upward movement of said upper member and maintain it in the raised position at which it stopped.

14. The device for testing the stretch of fabric samples according to claim 13 and characterized further by manually operable actuating means for controlling the pneumatic feed to and discharge from said piston-cylinder mechanism, said actuating means being manually engageable to open the pneumatic feed to said piston-cylinder mechanism through said valve unit to actuate operation of the device and being disengageable to stop the pneumatic feed and to discharge the piston-cylinder mechanism to effect lowering of the upper member.

References Cited

UNITED STATES PATENTS

| 2,187,914 | 1/1940 | Reitan | 73—95 |
| 2,318,530 | 5/1943 | Shick et al. | 73—95 |

FOREIGN PATENTS

| 559,748 | 7/1958 | Canada. |

JAMES J. GILL, *Primary Examiner.*

JERRY W. MYRACLE, *Assistant Examiner.*

U.S. Cl. X.R.

73—159

UNITED STATES PATENT OFFICE
CERTIFICATE OF CORRECTION

Patent No. 3,444,728  Dated May 20, 1969

Inventor(s) Charles W. Burns

It is certified that error appears in the above-identified patent and that said Letters Patent are hereby corrected as shown below:

Column 3, line 24, "portions" should read -- portion --; Column 4, line 15, "fabrgic" should read -- fabric --; Column 6, line 11, "said" should read -- and --.

SIGNED AND
SEALED
MAR 10 1970

(SEAL)
Attest:

Edward M. Fletcher, Jr.
Attesting Officer

WILLIAM E. SCHUYLER, JR.
Commissioner of Patents

UNITED STATES PATENT OFFICE
CERTIFICATE OF CORRECTION

Patent No. 3,444,728

May 20, 1969

Charles W. Burns

It is certified that error appears in the above identified patent and that said Letters Patent are hereby corrected as shown below:

Column 5, line 65, "theeron" should read -- thereon --. Colum 6, line 11, "indcia" should read -- indicia --; line 68, "aing" should read -- ing --.

Signed and sealed this 19th day of May 1970.

(SEAL)
Attest:

Edward M. Fletcher, Jr.
Attesting Officer

WILLIAM E. SCHUYLER, JR.
Commissioner of Patents